United States Patent
Mängel (10) Patent No.: US 10,189,610 B2
(45) Date of Patent: Jan. 29, 2019

(54) STERILIZABLE PVC-FREE CLOSURES (75) Inventor: Dany Mängel, Twistringen (DE)

(73) Assignee: ACTEGA DS GMBH, Bremen (DE)

(*) Notice: Subject to any disclaimer, the term of this patent is extended or adjusted under 35 U.S.C. 154(b) by 1082 days.

(21) Appl. No.: 14/072,483

(22) PCT Filed: May 11, 2011

(86) PCT No.: PCT/EP2011/057652
§ 371 (c)(1),
(2), (4) Date: Mar. 24, 2014

(87) PCT Pub. No.: WO2012/152330
PCT Pub. Date: Nov. 15, 2012

(65) Prior Publication Data
US 2015/0028035 A1    Jan. 29, 2015

(51) Int. Cl.
| | |
|---|---|
| *B65D 41/04* | (2006.01) |
| *B65D 41/00* | (2006.01) |
| *B65D 41/02* | (2006.01) |
| *B32B 1/02* | (2006.01) |
| *B65D 53/02* | (2006.01) |
| *B65D 53/04* | (2006.01) |
| *C09K 3/10* | (2006.01) |
| *C08L 23/10* | (2006.01) |

(52) U.S. Cl.
CPC ............ *B65D 41/0407* (2013.01); *B32B 1/02* (2013.01); *B65D 41/005* (2013.01); *B65D 41/02* (2013.01); *B65D 41/023* (2013.01); *B65D 41/04* (2013.01); *B65D 41/045* (2013.01); *B65D 41/0435* (2013.01); *B65D 41/0442* (2013.01); *B65D 41/0457* (2013.01); *B65D 41/0464* (2013.01); *B65D 41/0478* (2013.01); *B65D 41/0492* (2013.01); *B65D 53/02* (2013.01); *B65D 53/04* (2013.01); *C08L 23/10* (2013.01); *C09K 3/10* (2013.01); *C09K 2003/109* (2013.01); *C09K 2200/062* (2013.01); *C09K 2200/0617* (2013.01); *C09K 2200/0642* (2013.01)

(58) Field of Classification Search
CPC .... B65D 41/005; B65D 41/02; B65D 41/023; B65D 41/04; B65D 41/0407; B65D 41/0435; B65D 41/045; B65D 41/0457; B65D 41/0464; B65D 41/0478; B65D 41/0492; B32B 1/02
See application file for complete search history.

(56) References Cited

U.S. PATENT DOCUMENTS

| | | | |
|---|---|---|---|
| 3,270,904 A | 9/1966 | Foster et al. | |
| 4,801,418 A | 1/1989 | Bersano | |
| 4,981,231 A * | 1/1991 | Knight | C09K 3/10 |
| | | | 215/341 |
| 5,060,818 A | 10/1991 | Doi et al. | |
| 6,677,397 B1 | 1/2004 | Baranowski et al. | |
| 2009/0230079 A1* | 9/2009 | Smolko | B65D 41/0442 |
| | | | 215/261 |
| 2010/0006532 A1 | 1/2010 | Lee | |
| 2010/0295211 A1 | 11/2010 | Poel-Asendorf et al. | |

FOREIGN PATENT DOCUMENTS

| | | |
|---|---|---|
| CN | 102666298 A | 9/2012 |
| EP | 2058379 A1 | 5/2009 |
| EP | 2223984 A1 | 9/2010 |
| JP | 61-276839 A | 12/1986 |
| JP | 63-196168 A | 8/1988 |
| JP | 2000239481 A | 9/2000 |
| JP | 2002265709 A | 9/2002 |
| JP | 2004505864 A | 2/2004 |
| WO | WO-2009059788 A1 | 5/2009 |
| WO | WO-2011060803 A1 | 5/2011 |
| WO | WO-2012152330 A1 | 11/2012 |

OTHER PUBLICATIONS

Wikipedia entry for "Thermoplastic elastomer", accessed May 11, 2017.*
Actega DS, "The PVC-Free Solution: Safe, Secure, Reliable," accessed at: http://www.actega.de/fileadmin/ACTEGA/downloads/ds/provalin/Provalin_Folder_fin.pdf, Accessed on Aug. 19, 2010.
International Search Report for International Application No. PCT/EP2011/057652, European Patent Office, Netherlands, dated May 24, 2012, 3 pages.
Adflex KS 084P, "Improve the durability of Polyurethane with Eternacoll Polycarbonate diols," Lyondell Basell, Oct. 17, 2018, 3 pages.
Ethylene-vinyl acetate, Wikipedia, Oct. 17, 2018, 4 pages.

* cited by examiner

*Primary Examiner* — Walter Aughenbaugh
(74) *Attorney, Agent, or Firm* — Sterne, Kessler, Goldstein & Fox P.L.L.C.

(57) ABSTRACT

The present invention relates to compositions (compounds) which can be used as seal material in vessel caps under sterilization conditions. More specifically, the invention relates to such compositions that are suitable for vessel caps or vacuum caps that can be unscrewed, such as cam screw caps and in particular Press-on/Twist-off® caps, and that demonstrate a reduced migration of undesirable substances.

23 Claims, 4 Drawing Sheets

STERILIZABLE PVC-FREE CLOSURES

1. TECHNICAL FIELD

The present invention relates to compositions (compounds) which can be used as seal material in vessel caps under sterilization conditions. More specifically, the invention relates to such compositions that are suitable for vessel caps or vacuum caps that can be unscrewed, such as lug screw caps and in particular Press-on/Twist-off® caps, and that demonstrate a reduced migration of undesirable substances.

2. BACKGROUND OF THE INVENTION

Seal materials for vessel caps that contain polyvinyl chloride (PVC) have long been used in the packaging industry.

The use of PVC-containing compositions in packaging materials is generally no longer desirable however for many reasons. When household waste is incinerated, acidic gases are produced from halogen plastics and the escape of said gases into the atmosphere is harmful. In addition, even small amounts of PVC interfere with the material recycling of plastic waste. Furthermore, PVC-based seal elements require the use of plasticizers, which may potentially migrate into the food contained in the vessel and are therefore questionable for health reasons.

The object of the present invention is to provide a PVC-free sealing compound (also referred to hereinafter as a polymer compound) for vessel caps, in particular for the packaging of foods. Foods (including beverages such as juices and the like) are often packaged in vessels made of glass or plastic, which in many cases then have a screw lid. The term "screw lid" is representative here for vessel caps that, in the filled and closed state, are engaged with the vessel by means of a thread. To open the vessel, the cap has to be rotated relative to the vessel, wherein the seal of the cap lifts from the vessel edge and the vacuum (often) provided in the vessel is cancelled. The cap can be separated from the vessel by such a rotation. The known PVC-containing seal materials have the processing and performance characteristics necessary for this purpose. It should thus be noted that a PVC-free sealing compound is only then a seal material of commercial interest for vessel caps if the PVC-free sealing compound has quite specific physical-chemical properties not inferior to the main properties of PVC-containing seal materials.

Since many foods and beverages are sterilized once the vessel has been filled and closed, a seal insert that withstands such measures is particularly desirable.

It has now surprisingly been found that this suitability for sterilization measures can be established on the seal material in a simple manner by means of dynamic mechanical thermal analysis (DMTA).

DMTA is a known method: appropriate measuring devices are commercially available. The principle of DMTA can be simply described: A sinusoidal oscillating force is applied to a material sample. The deformation of the material is measured. Here, both the amplitude and the phase shift of the deformation with respect to the applied force are determined. The viscoelastic properties of a sample can be determined from the measured values as a function of time and temperature. Besides the glass transition temperature $T_g$, these include the storage module G' and the loss module G" of the material. With most devices, forced oscillations outside the resonance are used. The sample is mechanically subjected to bending load, strain, or shear load with defined frequency and at defined temperature. The mechanical loading is applied here either separately after static medium load and dynamic component, or in one step by means of deformers. The dynamic loading is generally produced by an electrodynamic oscillator, which, depending on the device, covers a specific frequency range. Temperature control is possible with most devices in a range from −100° C. to over +300° C. During the measurement process, the force and deformation signals are recorded, and the phase angle between the two signals is determined by means of Fourier analysis.

Alternatively, measurements of this type can also be carried out in an oscillation rheometer on polymer melts. To this end, a circular disc-shaped sample of defined layer thickness is introduced into a cone and plate system and is heated by 5K min$^{-1}$ to 180° C. and is measured in a cooling-heating cycle.

Sterilizable seal materials can be identified in accordance with the invention in that they basically demonstrate the behavior defined in claim 1.

In any individual case, attention should be paid to the conditions of the intended sterilization treatment when assessing the DMTA data. The maximum possible sterilization temperature is lower, the higher is the pressure on the cap. Generally, the inflection point (without counterpressure) should be at least 10° C. higher than the desired sterilization temperature. With counterpressure, an even greater distancing of 20° C. and more may be necessary.

The heating curve for the phase angle tan (delta) may demonstrate more than one inflection point, for example if individual components already exhibit a phase transition (which then occurs at relatively low temperatures) before the material softens as a whole.

In such cases, such inflection points should not be considered, but merely the inflection point that corresponds to the softening of the seal material as a whole.

More specific requirements for example include the following aspects:

The material composition is to be selected such that undesirable substances are avoided. The sealing compound should therefore not contain substances that are classified as presenting a health risk, in particular plasticizers, such as phthalates; semicarbazide and sources thereof, in particular ADC and OBSH; 2-ethylhexanoic acid and sources thereof; organic tin compounds, primary aromatic amines, bisphenols, nonylphenol; BADGE; photoinitiators; perhalogenated compounds; melamine.

For some applications, the presence of larger contents of liquid substances (that is to say substances that are liquid at RT) is undesirable. Then, the content of such substances (such as white oil) should be at most 10%, preferably less restricted, and in some cases the sealing compound should have no traceable contents of such liquid substances.

If bisphenol-A and melamine are to be avoided, coatings that do not contain such substances are used for the vessel cap. The seal material should then be composed such that a lasting adhesive bond is achieved with such coatings.

The material composition should be selected such that the seal material satisfies even challenging requirements during use.

The seal material should thus preferably be usable under pasteurization or even sterilization conditions, that is to say should withstand a pasteurization (up to 98° C.) or a sterilization (generally above 100° C., often above 105° C. or above 110° C., or even above 120°, up to 132° C.).

For some uses, the seal material should have a barrier function, that is to say should reduce or prevent the infiltration of undesirable substances into the vessel.

For specific applications, it should be possible to provide the seal material with absorbing additives (for example oxygen absorbers) or scavenger substances.

The seal material must have the required processing characteristics.

In principle, it must soften thermally to a sufficient extent so as to be useable on conventional processing machines (in particular in injection molding methods, but also for extrusion with subsequent stamping or compression molding).

It must therefore have the necessary sealing properties after introduction into the vessel cap and cooling to the desired application temperature (generally RT, but possibly also at lower temperatures, for example in a chilling cabinet).

It must also be possible to introduce the seal material over the entire area for small vessel caps.

For PT caps (Press-on Twist-off® caps), the seal material must form both the seal and the inner thread of the cap, and it must therefore be possible to apply the seal material (as what is known as a "contoured ring") both to the inner face and to the skirt of the cap, and the seal material must also be able to form the thread elements when the cap is pressed on.

For some applications, the seal material should be able to form the seal insert "out shell", that is to say outside the cap, the seal insert then being inserted as a finished ring seal or the like into the vessel cap.

The seal material is to be suitable in particular for metal caps and metal-plastic composites that may be coated on the inner face, however it is also to be suitable for plastic caps.

The seal material must be suitable for conventional food packagings.

The seal insert must be suitable for pasteurization (up to 98° C. or more) and should preferably also be suitable for sterilization (up to 132° C.).

The seal insert must withstand a post-treatment (pasteurization and the like) at counterpressure and evacuation; if necessary, it must have vacuum retention and barrier properties where applicable.

The seal insert is to be suitable for conventional vessels made of metal, plastic, glass, etc.

In the event of contact with the filled content, in particular fat-containing foods, alcoholic beverages and other products of lipophilic nature (compared to water), the seal insert is to deliver no components or minimal components to the filled content.

The seal insert must demonstrate sufficiently low twist-off values in order to be able to remove the vessel cap (possibly with cooling) with moderate force. At the same time, the seal must demonstrate its sealing effect over the intended lifetime (minimum shelf life) of the food.

The objects addressed by the present invention are achieved by the PVC-free compositions defined in the independent claims. Advantageous embodiments are defined in dependent claims.

3. SUMMARY OF THE INVENTION

Polymer compounds according to the invention are generally used as seal material or sealing compound. Here, a compound is understood to mean a substance mixture that, besides at least one polymer, comprises further substances. Here, the further substances may be other polymers, extenders, lubricants, antioxidants, pigments, and other additives, for example.

The PVC-free compositions according to the invention can be made sufficiently fluid by heating. The sealing compound can only thus be applied to the vessel cap blank by means of extrusion or a similar method in the region of the seal element to be produced.

The PVC-free composition applied to the inner face of the vessel cap can then be shaped mechanically into the desired seal element. After cooling, the applied composition may retain its shape and, in the closed state, may rest sealingly against the opening of the vessel to be closed by the vessel cap.

Here, the PVC-free composition may preferably be used in the production of any vessel caps, such as for the production of seals in lug screw caps, screw lids, rotatable crown caps, bottle screw caps and Press-on Twist-off® caps.

The PVC-free composition according to the invention is thus in particular a seal material which is suitable for vessel caps and which is easily processed, enables quick throughputs in industrial production, can be used under pasteurization conditions and/or under sterilization conditions, presents no risk to health, even in the case of fat-containing filled contents, is based largely or completely on non-crosslinked polymers and is completely free or in any case is substantially free from substances that present a health risk (such as plasticizers and the like), is cost-effective, and/or allows for production of vessel caps that, in the closed state, demonstrate a gas barrier effect, a pressure relief valve effect and/or vacuum retention.

A seal material according to the invention generally comprises a mixture of chemically different components, which comprises at least one polymer, generally at least two different polymers, and further components such as lubricants, stabilizers and possibly further components, which are used to adjust the desired performance characteristics.

A specific field of application of the invention is constituted for example by Press-on Twist-off® caps, which are very popular for example for baby food.

According to definition, a "Press-on Twist-off® cap" is a cap that, when attached for the first time is pressed onto the vessel to be closed ("Press-on"), but when removed has to be rotated ("Twist-off"). This is in contrast to screw caps, which require a rotary motion both when closing the vessel and when opening the vessel.

The basic principle of Press-on Twist-off® vessel caps is described for example in patent document U.S. Pat. No. 3,270,904, which was published in 1966:

A plastic compound is applied to the side walls of the vessel cap and deforms as the vessel is closed in such a way that threads are formed which cooperate with the thread elements of the vessel (see column 2, line 16 of U.S. Pat. No. 3,270,904). In contrast to screw caps and cam screw caps, the (metallic) main body of the vessel cap itself has no thread; the thread is formed exclusively by the polymer material of the sealing compound. Due to the threads formed as the vessel cap is pressed on, a rotary movement is mandatory in order to remove the vessel cap. The plastic compound applied to the inner face of the vessel cap thus performs both a sealing function and a holding function (see the "dual function" described in column 2, lines 4-10 for U.S. Pat. No. 3,270,904) in the case of a Press-on Twist-off® vessel cap (referred to in U.S. Pat. No. 3,270,904 as a Press-on Turn-off cap).

Previously, PVC-based compounds were always used industrially for such vessel caps.

Although the basic operating principle of Press-on Twist-off® vessel caps has been known for decades, the cost-effective (that is to say quick) production of these caps for the packaging industry has been a considerable challenge until now. Here, a person skilled in the art is faced in particular with the following tasks:

The sealing compound applied to the inner face of the vessel cap inevitably comes into contact with the foods located in the vessel to be closed. In view of the fact that the migration of components of the seal insert of the vessel cap into the food is not only undesirable, but is also subject to strict legal provisions (see first paragraph on page 15 of the description of the present application), the selection of the seal materials conceivable in principle is immediately restricted. A replacement for PVC compounds has been sought without success for years.

For baby food, melamine-free packagings are preferably suitable. The corresponding vessel caps often have to be provided with inner coatings that then have to be free from melamine. For example, polyester coatings are suitable. The seal material then has to be sufficiently adhesive to such coatings.

Figure 2:
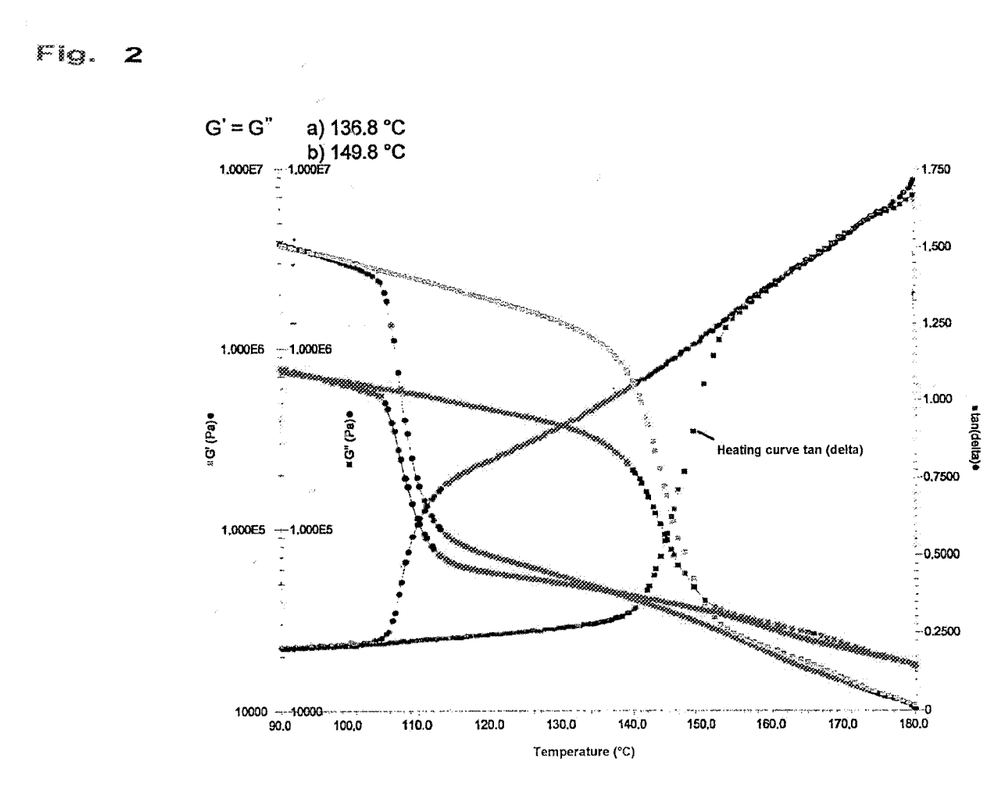
Figure 3:
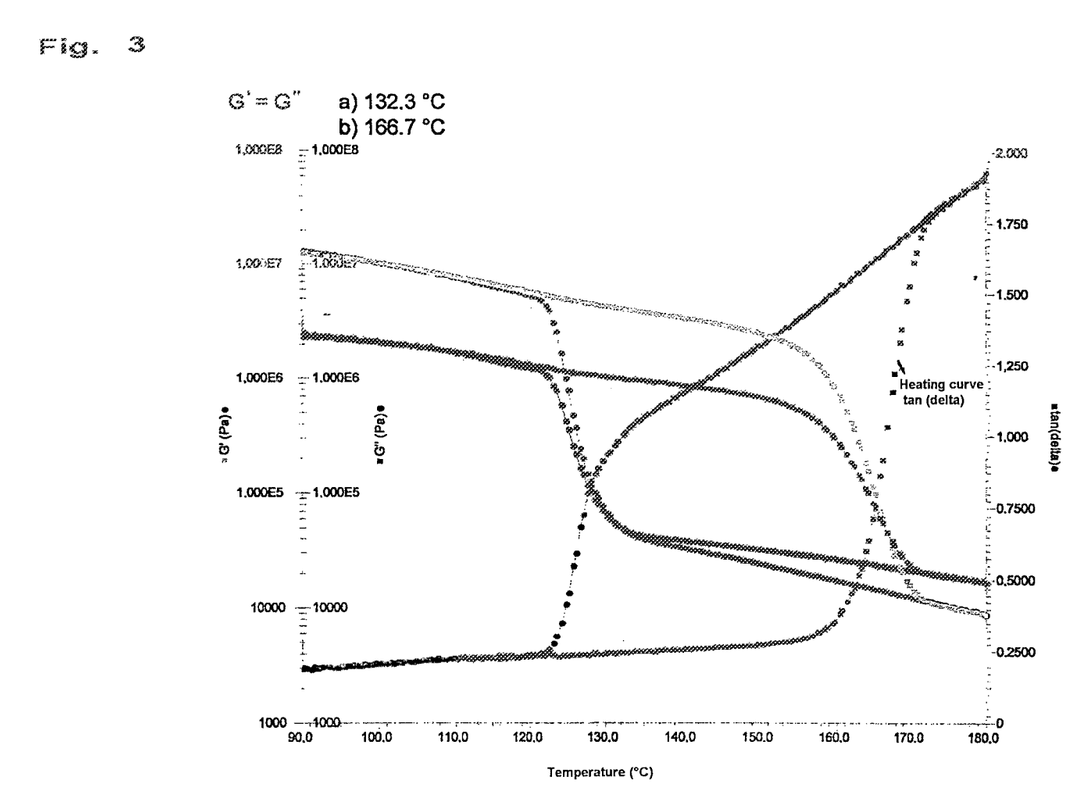
Figure 4:
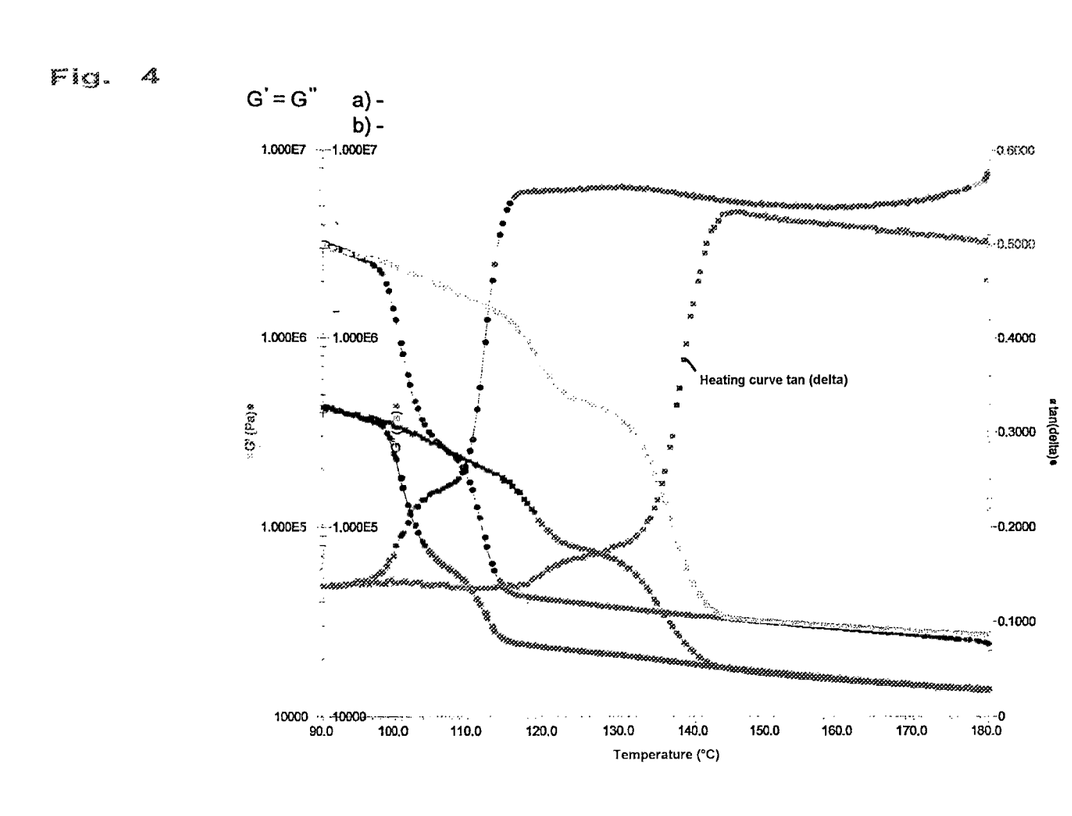

The seal material attached to the inner face of the cover plate is used to hermetically seal the vessel to be closed, that is to say imperatively has a sealing function. In contrast hereto, the seal material attached to the side walls of the vessel cap is used to cooperate with the thread elements, in particular in the event of unscrewing, and thus predominantly has a levering function (see FIG. 2 of U.S. Pat. No. 3,270,907). In a view of these different functions, it would be expedient to use two different materials having material properties tailored to the respective function. Such an embodiment could only be produced however with high outlay and is therefore of absolutely no interest from an economical viewpoint. The desired high production rates are then only achieved if the material on the inner face of the cover plate and on the side walls of the vessel cap is the same.

For the sealing function, an at least partially resilient material is required, which can produce the necessary fit against the vessel edge, vacuum retention, and possibly also a barrier effect with respect to the infiltration of harmful substances, oxygen and the like.

In contrast hereto, a rigid/hard material is instead required for the holding function, since the vessel cap could otherwise be lifted without rotary movement or the thread elements of the cap might not withstand the twist-off forces. The use of the same material both for the holding function and for the sealing function therefore constitutes a great challenge to a person skilled in the art.

It must be possible to bring the seal material into the required shape in the cap blank, in particular by means of stamping or by insertion by means of injection molding. In doing so, not only does the ring seal that in the closed state of the container rests sealingly against the container opening edge have to be formed. At the same time, the material which, when the cap is pressed on, forms the inner thread thereof also has to be distributed on the inner side wall (skirt) of the cap. To this end, the sufficiently heated, fluid compound has to be able to flow laterally around the stamp at the stamping temperature and simultaneously into the space between the stamp and the side wall of the cap.

The selection of the appropriate seal material is further impaired by the necessary thermal properties. When applying the lid, the seal material must be sufficiently deformable in order to form the thread elements of the container to be closed. The seal material must still withstand pasteurization and/or sterilization conditions and may therefore only be fluid to a limited extent, for example.

It immediately appears that the provision of a PVC-free Press-on Twist-off® vessel cap presents a person skilled in the art with a challenge that is much more difficult than merely providing another vessel cap.

PVC-free compositions have already been described in the prior art for certain caps, but have not been used successfully on an industrial scale.

For example, WO 2009/059788 discloses a composition comprising an ethylene octene copolymer mixed with ethylene vinyl acetate (EVA) and polypropylene (PP). In practice, these compounds having high EVA proportions (here: 40%) have proven to be less preferable however. The invention preferably comprises compounds having EVA proportions of less than 40%, and particularly preferably compounds that contain no EVA.

A composition that contains two polymers, specifically an ethylene octene block copolymer (39.1%) and an ethylene octene random copolymer (60%) with a Shore A hardness of 85 at a Shore D hardness of 25 is known from international patent application PCT/EP2009/008273.

This formulation also fails to meet all requirements, in particular in the case of Press-on Twist off® caps which can withstand a pasteurizing or even sterilizing post-treatment of the filled and closed vessel. By contrast, the invention presents compositions with which demanding requirements, such as seals for Press-on Twist-off® caps, can be much better met.

4. DEFINITIONS

In the context of the present invention, the term "PVC-free composition" denotes a composition that comprises less than 1% by weight, preferably less than 0.5% by weight, even more preferably less than 0.1% by weight or less than 1% by weight, and most preferably (within the limits of analytical determination) even no PVC (in each case in relation to the total weight of the PVC-free composition). In the context of the present invention, "PVC free compositions" are considered only to be those compositions that can be used as sealing compound in vessel caps. For example, a melt adhesive or a pure polymer therefore is not a "PVC-free composition" in the context of the present invention, even if no PVC is contained therein.

In the context of the present invention, the term "plastic" denotes a material that comprises at least one synthetic or semi-synthetic polymer.

In the context of the present invention, the term "block copolymer" denotes a copolymer that consists of longer sequences or blocks of each monomer (for example AAAAAAAAABBBBBBBBBBBB, etc.). Depending on the number of blocks, reference is also made to diblock copolymers, triblock copolymers, etc.

In the context of the present invention, the term "elastomer alloy" denotes a mixture that comprises a plastic matrix and an elastomer potentially dispersed therein. The plastic matrix may be a thermoplastic, for example.

In the context of the present invention, the term "thermoplastic" denotes a plastic that can plastically deform by heating, provided the temperature reached by heating lies within a material-specific temperature range. A thermoplastic can be heated and cooled reversibly up to a material-specific upper limit, without thermal decomposition.

In the context of the present invention, the term "elastomer" denotes a rigid plastic which can elastically deform typically at room temperature. The glass transition point of an elastomer typically lies below room temperature. Elastomers as such typically cannot melt.

5. DETAILED DESCRIPTION OF THE INVENTION

The compositions according to the invention generally comprise at least one polymer, usually two chemically and physically different polymers, and additionally
- a third polymer that is chemically and physically different from the two aforementioned polymers;
- are suitable for a pasteurizing, in particular also for a sterilizing, post-treatment (at temperatures above 100° C. and up to 132° C.), and/or
- have a Shore A hardness between 40 and 95, preferably 45 to 90, more preferably between 50 and 85 (in particular between 70 and 85), both under the conditions of 30 min/20° C. and 24 h/20° C. and have a compression set CS (in percent, similarly to ASTMD 395-97, method B under the conditions of 22 h/70° C.) between 40 and 95, more specifically between 50 and 90, preferably between 50 and 80, particularly preferably between 50 and 70, and specifically between 50 and 60. Here, it is desirable in accordance with the invention for the CS under the conditions of 22 h/20° C. to lie below 20, and under the conditions of 22 h/100° C. to lie below 95, specifically below 90 and particularly preferably between 80 and 90.

5.1 Preferred Embodiments with 3 Polymers

In some preferred embodiments, the PVC-free sealing compound is a mixture that comprises at least three different plastics, which will be referred to hereinafter as plastic 1, plastic 2 and plastic 3.

The PVC-free composition according to the invention preferably comprises
- plastic 1
- plastic 2
- plastic 3
- optionally plastic 4,
- optionally at least one liquid component
- optionally at least one lubricant
- optionally at least one stabilizer,
- optionally at least one pigment, and/or
- optionally at least one filler.

At least one plastic in this embodiment is a substantially non-resilient, thermoplastic polymer. A typical example is polypropylene (PP).

The other plastics are then preferably resilient thermoplastic polymers and/or thermoplastic elastomers.

A distinction is usually made between two types of resilient thermoplastics: (A) block copolymers and (B) elastomer alloys.

Plastic 1, plastic 2 and/or plastic 3 may be block copolymers or polymer alloys. In the context of the present invention, the terms "plastic 1", "plastic 2" and "plastic 3" are to be understood broadly. Plastic 1, plastic 2 and plastic 3 may be pure substances (for example a block copolymer, a homopolymer, etc.) or may be mixtures (for example a polymer blend, a polymer alloy, etc.). If plastic 1, 2 and/or 3 is/are a polymer blend or a polymer alloy, the PVC-free composition according to the invention comprises more than three different types of polymer.

It has now surprisingly been found that the problem addressed by the present invention can be solved in preferred embodiments of the invention by a PVC-free composition which comprises plastic 1, plastic 2 and plastic 3, which are appropriately selected in a targeted manner from the large number of aforementioned, known plastics.

Plastic 1 is preferably a polymer (or a polymer mixture), which primarily has the properties of a thermoplastic. In very preferred embodiments, plastic 1 is a conventional thermoplastic, for example polypropylene or a similar polyolefin.

In contrast hereto, plastic 2 is preferably a thermoplastic elastomer. In a particularly preferred embodiment, plastic 3 is a material such as SEBS.

In accordance with the invention, plastic 3 is preferably a resilient thermoplastic, which constitutes a balanced compromise between an elastomer and a thermoplastic. In a specific embodiment, plastic 2 is an olefin copolymer.

In a preferred embodiment of the invention, the composition according to the invention comprises no compounds of which the polymeric main components consist of 39-40% of ethylene octene block copolymer and 45-60% of ethylene octene random copolymer, in particular if a content of up to 10% PP is additionally present.

In certain embodiments of the invention, the primary polymer component is a thermoplastic elastomer or a resilient thermoplastic, in particular selected from SEBS, propylene-based elastomers and terpolymers.

Figure 1:
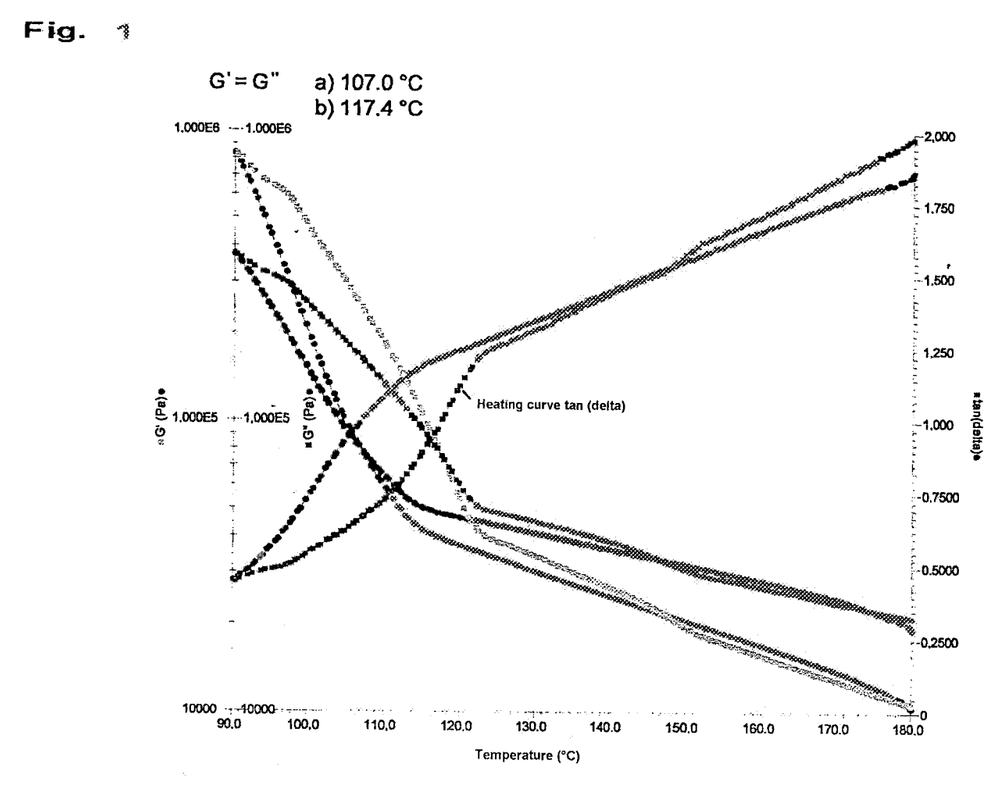

A preferred embodiment of the present invention is illustrated schematically in FIG. 1.

5.1.1 Relationships Between Plastic 1, Plastic 2 and Plastic 3

The selection of the plastics 1, 2 and 3 according to the invention can differ considerably depending in part on the field of application. Nevertheless, at least one of the relationships listed below between plastics 1, 2 and 3 is applicable irrespective of the type of vessel cap.

In preferred embodiments of the invention, a number, or even all, of the following relationships apply:

Minimum Temperature at which Plastic Deformation is Possible:
  plastic 1<plastic 3<plastic 2
Glass Transition Temperature ($T_g$),
  plastic 1>plastic 3>plastic 2
Shore A Hardness,
  plastic 1>plastic 3>plastic 2
Modulus of Elasticity
  plastic 1>plastic 3>plastic 2
Compression Set (22 h/70° C.)
  plastic 1>plastic 3>plastic 2

5.1.2 Selection Of Plastic 1, Plastic 2 and Plastic 3

Plastic 1, plastic 2 and plastic 3 are preferably known, commercially available plastics. On the basis of the above details concerning compression set, Shore A hardness, glass transition temperature, etc., a person skilled in the art is able to identify suitable, commercially obtainable plastics, polymers, polymer alloys, etc.

The following trade products can be considered for example as plastic 1: metallocene-catalyzed polypropylene, such as Metocene® HM; and other polyolefins, for example PE, LDPE.

Inter alia, the following trade products can be considered for plastic 2: SEBS, for example Taipol® or Kraton®; OBCs such as Infuse®.

Inter alia the following trade products can be considered for plastic 3: resilient thermoplastics, for example POEs such as Engage®, Vistamaxx®.

5.1.3 Quantities

The proportions by weight of plastic 1, 2 and 3 in the PVC-free composition according to the invention may vary depending on use.

The proportion by weight of plastic 1 typically lies in a range from above 0% by weight to 80% by weight, in relation to the total weight of the PVC-free composition according to the invention. The proportion by weight of plastic 1 preferably lies in a range from 10% by weight to 70% by weight, in relation to the total weight of the PVC-free composition according to the invention. The proportion by weight of plastic 1 most preferably lies in a range from 10% by weight to 50% by weight, in relation to the total weight of the PVC-free composition according to the invention.

The proportion by weight of plastic 2 typically lies in a range from above 0% by weight to almost 100% by weight, more specifically up to 70% by weight, in relation to the total weight of the PVC-free composition according to the invention. The proportion by weight of plastic 2 preferably lies in a range from 10% by weight to 50% by weight, in relation to the total weight of the PVC-free composition according to the invention. The proportion by weight of plastic 2 most preferably lies in a range from 20% by weight to 35% by weight, in relation to the total weight of the PVC-free composition according to the invention.

The proportion by weight of plastic 3 typically lies in a range from 10% by weight to 50% by weight, in relation to the total weight of the PVC-free composition according to the invention. The proportion by weight of plastic 3 preferably lies in a range from 15% by weight to 40% by weight, in relation to the total weight of the PVC-free composition according to the invention. The proportion by weight of plastic 3 most preferably lies in a range from 20% by weight to 40% by weight, in relation to the total weight of the PVC-free composition according to the invention.

A person skilled in the art understands that the sum of the % by weight of plastic 1, plastic 2 and plastic 3 may at most be 100% by weight. If the sum of the % by weight of plastic 1, plastic 2 and plastic 3 is less than 100% by weight, the PVC-free composition comprises further components.

5.1.4 Further Optional Components

The composition according to the invention may optionally comprise a liquid component, such as white oil, in particular in the case of compounds that comprise a thermoplastic elastomer, such as SEBS. Such compounds may be suitable for sterilization, but are less suitable for fatty filled contents.

The composition according to the invention may further comprise lubricants. The purpose of the lubricant is to reduce the twist-off resistance.

Conventional components, such as stabilizers, pigments, fillers and the like may additionally also be provided in conventional small proportions.

5.1.5 Exemplary Embodiments

Exemplary Embodiment 1

| plastic 1 | polypropylene | 10% by weight |
| plastic 2 | olefin block copolymer | 48.8% by weight |
| plastic 3 | polyolefin elastomer | 40% by weight |
| lubricant | | 0.6% by weight |
| stabilizer | | 0.3% by weight |
| pigment | | 0.3% by weight |

Shore A hardness (24 h/20° C.)=78
CS (22 h/70° C.)=59

This sealing compound is extremely suitable for fat-containing filled contents and can be pasteurized, but cannot be sterilized. It can be used at counterpressure up to 98° C., without counterpressure up to a maximum of 105° C.

Exemplary Embodiment 2

| plastic 1 | polypropylene | 26% by weight |
| plastic 2 | SEBS | 27% by weight |
| plastic 3 | polyolefin elastomer | 38% by weight |
| adhesion promoter | polyester | 8% by weight |
| lubricant | | 0.5% by weight |
| stabilizer | | 0.2% by weight |
| pigment | | 0.3% by weight |

This sealing compound is suitable for PT caps. It is suitable for fatty filled contents and can be sterilized.
Shore A (24 h/20° C.)=78
CS (22 h/70° C.)=69

Exemplary Embodiment 3

| plastic 1 | polypropylene | 35% by weight |
| plastic 2 | olefin block copolymer + SEBS | 44% by weight |
| plastic 3 | polyolefin elastomer | 20% by weight |
| lubricant | | 0.5% by weight |
| stabilizer | | 0.5% by weight |

Shore A (24 h/20° C.)=90

This embodiment is suitable for fatty filled contents and can be sterilized. It is suitable for PT caps.

5.2 Preferred Embodiments with Plastics 1 and 2

In other preferred embodiments, the third plastic can be omitted and is then often replaced by a component that is liquid at the application temperature (typically RT), in particular an oil extender.

Such embodiments generally contain (in relation to the total weight of the sealing compound) at least 5% by weight of a thermoplastic elastomer, preferably based on styrene. Styrene-based block copolymers, such as SBS, SEBS, SIBS, are preferred. The compound particularly preferably contains at least 5% by weight of a styrene ethylene butylene styrene block copolymer (SEBS) and a minimum content of 10% of a polyolefin polymer. PP or HDPE are suitable as polyolefin components, even when mixed with LDPE and/or LLDPE.

Such sealing compounds often contain significant quantities of oil, up to more than 50% by weight, but preferably between 5% by weight and 50% by weight and particularly preferably between 35% by weight and 50% by weight. White oil (with suitable viscosity, for example viscosity 70) is the most preferred oil component.

These sealing compounds can be pasteurized and can usually also be sterilized.

5.2.1 Exemplary Embodiment 4

A preferred embodiment according to this aspect of the invention has the following composition:

| plastic 1 | polypropylene + LDPE | 25% by weight |
|---|---|---|
| plastic 2 | SEBS | 33% by weight |
| oil component | white oil | 40% by weight |
| lubricant | | 1% by weight |
| stabilizer | | 1% by weight |

Shore A (24 h)=68
CS (22 h/70° C.)=27

These embodiments are particularly suitable for seal inserts that do not come into contact with fat-containing filled contents. It can be used for PT caps and can be sterilized.

5.3 Embodiments with Just One Plastic

Most compounds with just one polymer (besides a lubricant, stabilizer and the like) are not suitable for the purposes of the invention. Compounds with a non elastomeric thermoplastic (for example most of the PP types) as the only polymer are too hard and are not resilient enough. By contrast, compounds with an elastomeric thermoplastic or thermoplastic elastomer are too soft.

An exception is constituted by poly(ethylene-co-propylene)-based compounds, which can be processed with contents of conventional lubricants, etc., to form a sealing compound according to the invention.

The poly(ethylene-co-propylene) forms the primary component of the sealing compound, which preferably has no (or only very minor) contents of other polymers.

These polymers have a density (ISO 1183) from 0.8 to 1.0, preferably 0.86 to 0.9 g/cm, and specifically approximately 0.88 g/cm, and a melt flow rate (MFR, ISO 1133) from 10 to 40, preferably 25 to 29 g/10 min, in particular approximately 27 g/10 min.

Seal inserts produced therefrom are hard (Shore D (15 see, ISO 868) in the range of 25-30, in particular approximately 28), can be used for fatty filled contents, and are suitable for PT caps. They can also be sterilized.

The suitability for sterilization can be ascertained on the seal material by appropriate tests.

A prediction of this suitability is possible by means of the known dynamic mechanical thermal analysis (DMTA). In principle, the heating curve for the phase angle (tan) delta is determined for this purpose, of which the inflection point should lie sufficiently (generally at least 10° C.) above the intended sterilization temperature.

The invention claimed is:

1. A vessel cap made of metal or plastic for a vessel for receiving foods or beverages, comprising a seal insert made of a seal material which comprises at least three different polymers mixed with further substances,
   wherein the seal material comprises no polyvinyl chloride (PVC),
   wherein the seal material is substantially free from components that are liquid at application temperature,
   wherein the seal material has a Shore A hardness between 40 and 95,
   wherein the seal material comprises at least three different polymers, wherein the first polymer is a propylene polymer and/or propylene copolymer, the second polymer is a thermoplastic elastomer, and the third polymer is a polyolefin elastomer,
   wherein the seal material is composed such that the seal insert withstands a sterilization at temperatures of above 100° C. and up to 132° C.,
   and wherein the seal material, in a dynamic mechanical thermal analysis (DMTA), demonstrates a heating curve for the phase angle tan (delta) the inflection point of which lies above the required sterilization temperature.

2. The vessel cap according to claim 1, wherein the inflection point lies in a region of the heating curve, which corresponds to the softening of the seal material on the whole and lies around at least 10° C. above the intended sterilization temperature.

3. The vessel cap according to claim 1, wherein the inflection point lies in a temperature range of the heating curve in which phase transitions of individual components at lower temperatures are already substantially complete.

4. The vessel cap according to claim 1, wherein the seal material, in relation to the total weight of the seal material, comprises a minimum content of 5% by weight of styrene-based block copolymer and a minimum content of 10% by weight of a propylene polymer and/or propylene copolymer.

5. The vessel cap according to claim 1, wherein the vessel cap corresponds to an inner diameter of the vessel opening of more than 2.5 cm.

6. The vessel cap according to claim 1, wherein the vessel cap is a lug screw cap, a cap that can be pressed on and twisted off, a hooded lid, a crimp-on or single-use cap, or a metal cap that can be rolled on.

7. The vessel cap according to claim 1, wherein the seal material is formed such that the seal insert can be used during a heat treatment (with or without pressure) of the filled vessel for the purpose of sterilization (above 98° C.).

8. The vessel cap according to claim 1, wherein the vessel cap, in the closed state, has a gas barrier effect and/or the effect of a pressure relief valve.

9. The vessel cap according to claim 1, wherein the vessel cap, in the closed state, demonstrates vacuum retention.

10. The vessel cap according to claim 1, wherein the Shore A hardness of the seal material is between 40 and 95 and the seal material, in the compression set test similar to ASTM D395-97 method B under the conditions of 22 h/70° C., demonstrates a compression set (CS) of 25-90%.

11. The vessel cap according to claim 1, wherein the seal material contains between 0.1 and 80% of at least one block copolymer, wherein the block copolymer is an interpolymer of ethylene with at least one $C_3$-$C_{20}$ alpha olefin or a copolymer of ethylene with a $C_3$-$C_{20}$ alpha olefin, optionally in combination with other unsaturated monomers.

12. The vessel cap according to claim 11, wherein the block copolymer has a density from 0.85 to 1.1 g/cm$^3$ and a melt flow index (WI) from 0.01 g/10 min to 1,000 g/10 min, with a production of 5 kg at 190° C.

13. The vessel cap according to claim 11, wherein the block copolymer is formed from an ethylene and an alkene.

14. The vessel cap according to claim 11, wherein the seal material contains between 0.1% and 80% of at least one random copolymer, wherein the random copolymer is a linear interpolymer of ethylene and a $C_3$-$C_{20}$ alpha olefin or a branched interpolymer of ethylene and a $C_3$-$C_{20}$ alpha olefin.

15. The vessel cap according to claim 14, wherein the random copolymer has a density from 0.85 to 1.1 g/cm$^3$ and a melt flow index (MFI) from 0.15 g/10 min to 100 g/10 min.

16. The vessel cap according to claim 15, wherein the random copolymer comprises two alkenes selected from the group consisting of ethylene, propene, butene, hexene and octene.

17. The vessel cap according to claim 11, wherein the seal material comprises up to 50% of polyolefins.

18. The vessel cap according to claim 1, wherein the seal material has a Shore A hardness from 65 to 90.

19. The vessel cap according to claim 1, wherein the compression set of the seal material under the conditions of 22 h/70° C. is between 55% and 75%.

20. The vessel cap according to claim 1, wherein the seal material contains between 5% and 70% of SEBS and between 10% and 50% of a propylene(co)polymer.

21. The vessel cap according to claim 20, wherein the seal material comprises between 20% and 50% of SEBS, and up to 25% of polyethylene, up to 50% of PP, and /or up to 50% of PP-based elastomer.

22. The vessel cap according to claim 1, wherein the seal material comprises a polyester.

23. A vessel for beverages or foods, comprising the vessel cap according to claim 1.

* * * * *